United States Patent Office 3,339,642
Patented Sept. 5, 1967

3,339,642
CULTIVATOR AND THE LIKE
Russell S. Pounds, Winter Garden, Fla., assignor of one-half to James Herbert Pounds, Winter Garden, Fla.
Filed Aug. 17, 1964, Ser. No. 389,847
9 Claims. (Cl. 172—79)

This invention relates to tractor mounted agriculture implements and more particularly to a novel and improved tractor mounted attachment which is especially useful in working soil underneath low hanging trees.

In fruit tree orchards, and particularly citrus groves, it is desirable, if not necessary, to cultivate the soil under and around the trees in order to eliminate weed growth, condition the soil for better penetration of rain, provide a soil mulch and for other purposes all intended to improve the yield of the trees. Citrus groves are usually planted with the trees in rows with the rows being spaced apart a sufficient distance that a tractor may be driven between next adjacent rows. In some groves the trees in each row are spaced apart sufficiently that a tractor may be driven therebetween. A known method of cultivating such groves is to provide a tractor with a cultivating attachment extending from one side thereof, whereby the tractor may be driven down rows of trees with the cultivator extending laterally of the path of movement of the tractor and underneath the low hanging branches of the trees so as to cultivate closely adjacent the trunks of the trees. Where the trees in each row are aligned substantially with the trees in next adjacent rows and are spaced apart sufficiently to permit the tractor to be driven laterally of the rows, the cultivator may be driven up and down the rows and then laterally across the rows to provide cultivation under and around each tree.

However, in order to provide a greater yield per acre, it is desirable to plant the trees in each row close together which precludes the passage of a tractor therebetween. In order to provide cultivation of the trees in such groves, it is known to provide a tractor mounted cultivator which may be retracted and extended laterally of the direction of movement of the tractor as the tractor is moved between next adjacent rows of trees. More particularly, as the tractor is moved along one side of a row of trees, the cultivator is extended so that the outer end thereof is disposed at least slightly beyond an imaginary line drawn between next adjacent trees in the row. As the cultivator approaches a tree it is retracted and as it passes the tree it is extended, thereby providing cultivation closely around the bases of the trees. The tractor may then be moved along the opposite side of the row, and cultivation provided in the same manner on the other side of the trees previously cultivated.

It is an object of the present invention to provide a novel and improved tractor mounted cultivator and the like which will permit working of the soil completely around the trees in a row thereby by passing the cultivator on each side of the row.

The object of the invention is achieved in one aspect thereof in a tractor on one side of which is disposed a gear box having an input drivingly connected to a power takeoff at the rear of the tractor. The gear box is mounted for swinging movement generally laterally of the tractor and about a horizontal axis disposed above the gear box. The output of the gear box is connected to one end of a telescoping countershaft extending laterally of and underneath the tractor body. The other end of the countershaft is drivingly connected to an agricultural implement, such as a cultivator disposed on, and extending laterally from, the side of the tractor opposite the gear box. The implement is connected for movement with the gear box laterally of the tractor, and selectively operable means are provided to swing the gear box and position it in one of a plurality of adjusted positions laterally of the tractor so as thus to position the implement in the desired extended position laterally of the tractor.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 4:
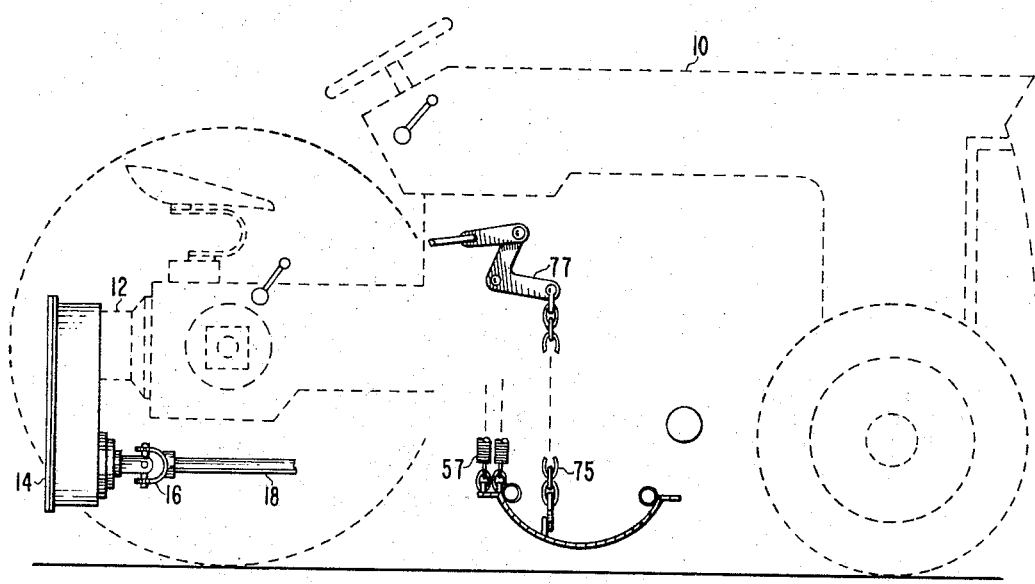
FIGURE 4 is a cross-sectional view substantially along the line 4—4 of FIG. 3.

With reference to the drawings there is shown in phantom, or broken lines, a tractor comprising a body 10 and having a power takeoff 12 at the rear thereof. Connected to the output of the power takeoff is a 180 degree drive mechanism 14, the output of which is connected through a universal joint 16 to one end of a telescoping drive shaft 18 extending underneath the left rear axle of the tractor and forwardly toward the front of the tractor. Adjacent the forward end of the drive shaft is a frame or housing 22 containing a gear train (not shown). The gear train has an input shaft connected to the forward end of the drive shaft 18 through a universal joint 20. The housing or gear box 22 is located between the front and rear axles and below the body of the tractor. In accordance with one aspect of the invention, the housing or gear box 22 is mounted for swinging movement about a horizontal axis spaced above the gear box and extending generally parallel to the longitudinal axis of the tractor. In the specific embodiment shown, and with particular reference to FIGS. 1 and 2, the gear box is journalled in a pair of bearings 24 mounted for movement with one end of a frame generally indicated at 26. More specifically the bearings 24 are disposed coaxially of each other in axially spaced relation and are fixedly mounted respectively to the lower ends of a pair of parallel arms 28 and 30. The upper ends of the arms are fixed to a support bar 32 having its longitudinal axis extending parallel to the axes of the gear box journal bearings 24. The frame 26 further comprises a cross bar 34 extending between and fixed to the arms 28 and 30. The support bar 32 is journalled in a pair of split bearings 36 and 38 which are bolted to the tractor body. In order to pivot the frame 26 about the axis of the support bar 32, there is provided a hydraulic cylinder 40 pivotally mounted at one end on the tractor body. The cylinder 40 contains a piston (not shown) the piston rod of which extends from the other end of the cylinder 40. The outer end of the piston rod is pivotally connected to a bracket 42 rigidly mounted on the arm 28 of the frame 26. Hydraulic lines are connected to the opposite ends of the cylinder 40 and lead to a control mechanism whereby the tractor operator may selectively introduce and withdraw fluid from the opposite ends of the cylinder 40, so that the frame 26 and thus the gear box 22 may be located in one of a plurality of positions about the axis of the support bar 32.

Figure 1:
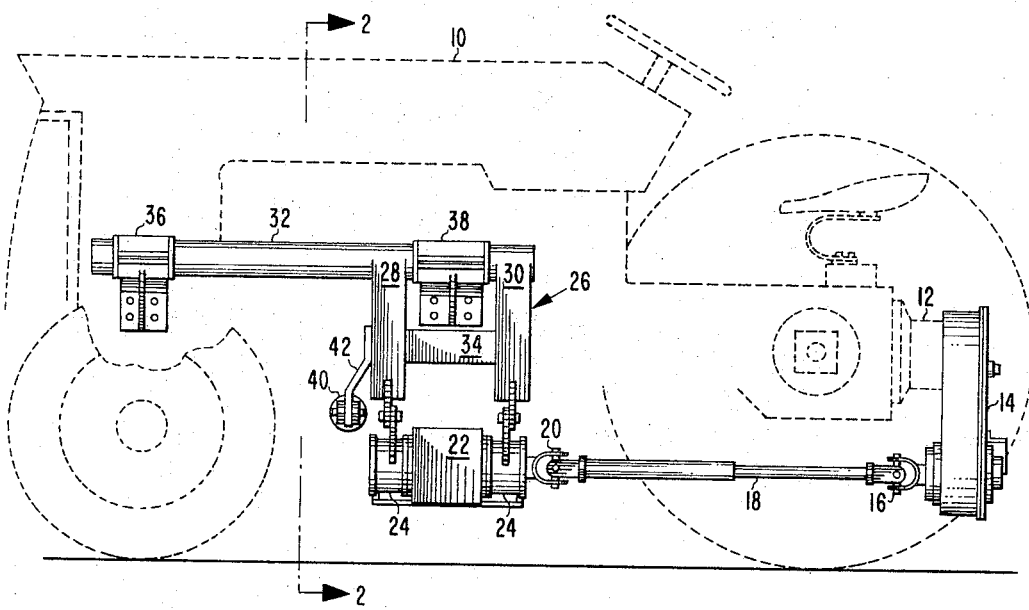
FIGURE 1 is a side elevational view of a tractor mounted agricultural implement incorporating the present invention with the tractor being shown in broken lines.

As clearly shown in FIGS. 1 and 2, the input shaft of the gear train in the housing or gear box 22 extends coaxially of the bearings 24, and the gear train has an output shaft disposed below the body of the tractor and extending at right angles of the input shaft and laterally across the tractor toward the other side thereof. The output of the gear box is connected to one end of a telescoping countershaft 44 which extends laterally underneath the tractor body to and beyond the other side thereof. The other end of the countershaft is drivingly connected by a universal joint 46 to the drive shaft of a cultivator 48 disposed on the right side of the tractor body and extending generally at right angles thereto. The cultivator is provided with skids at the opposite ends thereof which support the cultivator on the ground and slide therealong. The cultivator is connected to the gear box 22 by means of frame generally indicated at 50 in FIG. 3. The frame 50 comprises a pair of parallel tubular sides 52 and 54 extending generally in the same direction as the countershaft 44. A weed guard 56 is fixed to and disposed beneath the tubular members 52, 54 and extends substantially coextensively therewith. The tubular members 52, 54 are rigidly connected at one end to the gear box 22 for movement therewith. Thus, it will be seen that the frame 26, housing 22 and frame 50 form an articulated frame assembly pivotally mounted at one end on the tractor body and extending laterally thereof for connection to the cultivator 48.

Figure 3:
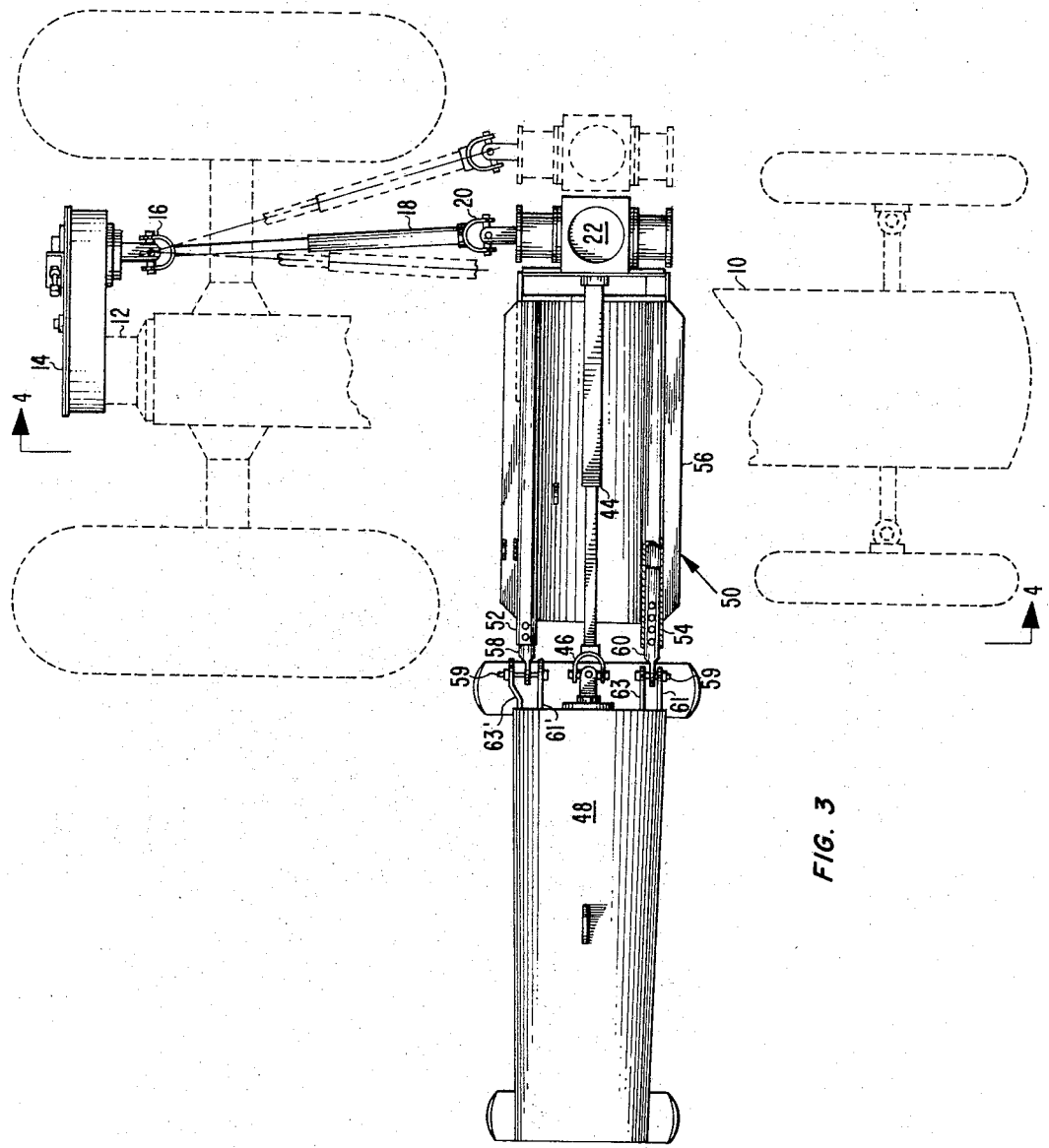
FIGURE 3 is a cross-sectional view substantially along the lines 3—3 of FIG. 2.

As best shown in FIG. 3, the end of the frame 50 opposite the gear box 22 is pivotally connected to the cultivator 48 for relative movement between the cultivator and frame about a horizontal axis preferably passing through the center of the universal joint 46. More particularly, a pair of cylindrical connecting members 58 and 60 are telescopically and slidably received within the ends of the tubular members 52, 54 opposite the gear box 22. Each of the tubular members is provided with a pair of apertures at the end thereof receiving the connecting members 58 and 60. Pins or bolts extend through the apertures in the tubular members and into apertures in the connecting members to retain the connecting members in the tubular members. The connecting members 58 and 60 have flattened outer ends each having an aperture receiving a bolt or pin 59. The bolts 59 are carried by two pairs of brackets 61, 63 and 61', 63' extending from the cultivator 48. The brackets of each pair are spaced apart longitudinally of the bolt a distance substantially greater than the thickness of the ends of the cylindrical members disposed therebetween.

Figure 2:
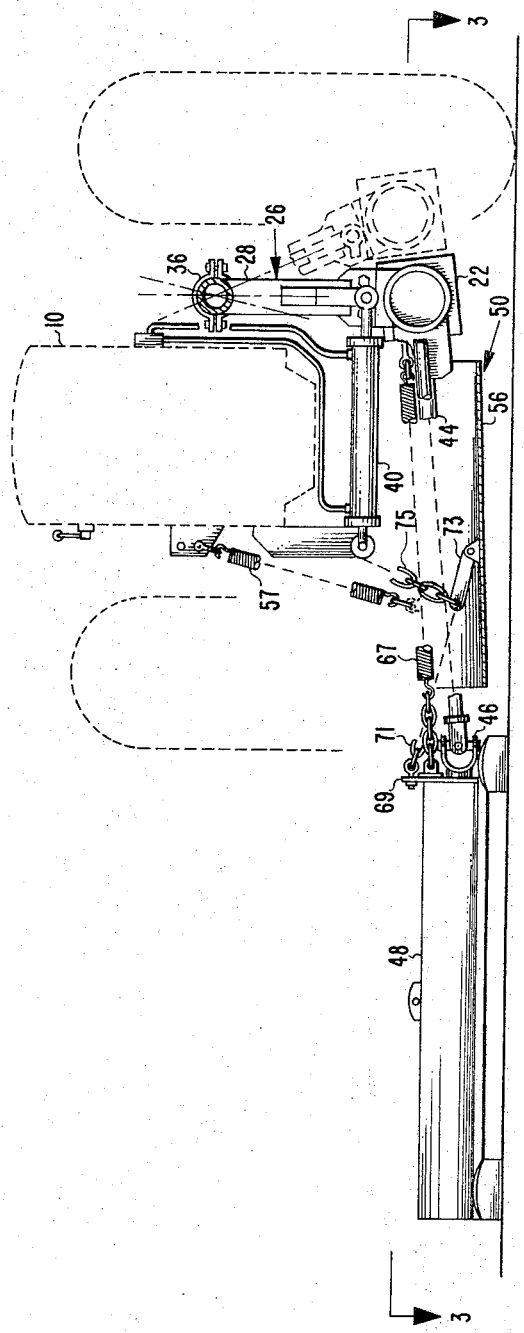
FIGURE 2 is a cross-sectional view substantially along the line 2—2 of FIG. 1 with portions of certain parts removed for clarity.

In the operation of the apparatus thus far described, the tractor is driven alongside a row of trees with the cultivator in horizontal position as shown in FIGS. 2 and 3. A pair of generally vertically extending counterbalance springs 57 are connected between the weed guard 56 and tractor body to tend to reduce the effect of the weight of the frame 50 on the cultivator. The cultivator will be driven by means of the power takeoff 12 through the drive shaft 18, and countershaft 44. As the tractor is passing between trees in the row, the cultivator will be extended to the right of the tractor by the introduction of pressurized hydraulic fluid into the rightward end, as viewed in FIG. 2, of the hydraulic cylinder 40 to pivot the frame 26 in a clockwise direction toward the tractor body and thus extend the cultivator laterally outwardly of the tractor. As a tree is approached, hydraulic fluid will be introduced into the leftward end of the hydraulic cylinder 40 and withdrawn from the rightward end of the cylinder to pivot the frame 26 in a counterclockwise direction as viewed in FIG. 2 and thus move the cultivator toward the tractor body to clear the tree. As the cultivator passes the tree the frame 26 is again swung inwardly of the tractor to extend the cultivator. In this manner cultivation of the soil is provided between trees in a row thereof where the trees are spaced sufficiently close that the tractor may not be passed therebetween. Additionally, the spacing between next adjacent rows of trees required for the passage of tractor need be substantially no greater than the width of the tractor itself, thus reducing the minimum spacing required between rows of trees and attendantly contributing to an increase in the productivity per acre.

When it is desired to move the tractor a substantial distance, such as between groves, the outer end of the cultivator may be manually lifted so as to pivot the cultivator about the axis of the connection between the frame 50 and the cultivator and position the cultivator in a generally vertical position. The cultivator may be held in this position by a rod connected between the cultivator and the tractor body. The lifting of the cultivator is aided by a counterbalance spring 67 connected at one end to the cultivator by a chain extending over the axis of the pivotal connection between the cultivator and frame 50 and connected to a bracket 69 on the top of the cultivator. The other end of the spring 67 is connected to the frame assembly connecting the cultivator to the support bar 32. Means are also provided for raising the cultivator and weed guard a short distance above the ground to clear objects or for any other reason. More particularly a chain 71 is connected to the bracket 69 on the cultivator with the other end of the chain leading to one end of a lever 73 the other end of which is pivotally mounted on the weed guard. The outer end of the lever 73 is connected to one end of a second chain 75 leading to one arm of a bell crank 77 shown in FIG. 4. The other arm of the crank is connected to suitable means controllable by the tractor driver for selective pivoting of the bell crank in a counterclockwise direction as viewed in FIG. 4 to effect simultaneous lifting of the weed guard and cultivator. At times it may be desired to move the cultivator in a circular path having a relative small radius of curvature. In order to facilitate such operation means are provided, whereby the cultivator may be inclined rearwardly of the longitudinal axis of the tractor. This is accomplished by extending the connecting member 60 from the outer end of the tubular member 54 a greater distance than the connecting member 58 extends outwardly of the tubular member 52. In this connection the connecting member 60 has, as shown in FIG. 3, additional openings alignable with openings in the end portion of the tubular member 54 to accommodate bolts or pins for retaining the connecting members in extended position. The spacing of the brackets 61, 63 and 61', 63' of each pair thereof which mount the bolts or pivot pins 59 permits horizontal angular displacement of the cultivator relative to the frame 50 without causing binding between the flattened ends of cylindrical members 58 and 60 and the brackets. While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In combination with a tractor having a body and a power takeoff, an agricultural implement disposed on one side of the tractor body and having a drive shaft, an articulated frame assembly extending from one end at the other side of said body and underneath said body toward said implement, means connecting the other end of said frame assembly and said implement for movement laterally of said body, means mounting said one end of said frame assembly on said other side of said tractor body for pivotal movement about a fixed horizontal axis extending longitudinally of the tractor, said frame assembly having at least one additional horizontal pivot axis intermediate its ends and disposed below said first axis, means for moving said frame assembly laterally of said tractor body, and means drivingly connecting said implement drive shaft and said power takeoff.

2. In combination with a tractor having a body and a power takeoff, a generally vertically extending first frame, means mounting the upper end of said first frame on one side of the tractor for pivotal movement about a first axis extending generally longitudinally of the tractor, a second frame disposed beneath said tractor body and extending laterally thereof, means pivotally connecting the lower end of the said first frame to one end of said second frame for relative movement between said frames about a horizontal second axis, an agricultural implement disposed on the side of said tractor body opposite said first frame and having a drive shaft, means connecting said implement and second frame for movement together laterally of the tractor, means providing a driving connection between said implement drive shaft and power takeoff, and means for moving said first frame about said first axis to move said implement laterally of the tractor.

3. In combination with a tractor having a body and a power takeoff, a first frame extending generally vertically and disposed on one side of said body, means pivotally supporting the upper end of said frame on said body for movement about a horizontal first axis, a second frame extending laterally of and underneath said body, means pivotally connecting one end of said second frame to the lower end of said first frame for relative movement therebetween about a horizontal second axis, means for moving one of said first and second frames laterally of the tractor an agricultural implement disposed on said side of the body opposite said first frame, means connecting said implement and second frame for movement together laterally of said body, a telescoping countershaft connected at one end to said implement, a telescoping drive shaft connected at one end to said takeoff, and a gear train having an input and an output connected respectively to said drive shaft and countershaft, the gear train input being movable with said lower end of said first frame about said first axis and the output being movable with said second frame about said second axis and laterally of said body.

4. In combination with a tractor having a rear axle, a body and a power takeoff at the rear of said body, a frame assembly including a generally vertically extending first frame, means pivotally mounting the upper end of said first frame on said body for movement about a horizontal first axis extending generally longitudinally of the tractor, said frame assembly further comprising a second frame disposed beneath the tractor and extending laterally thereof, means pivotally connecting one end of said second frame to the lower end of said first frame for relative movement between said first and second frames about a longitudinal second axis extending parallel to said first axis and disposed below said tractor body, an agricultural implement disposed on the side of said tractor body opposite said first frame, means pivotally connecting said implement to the other end of said second frame for movement together laterally of the tractor and for relative movement therebetween about a horizontal third axis, a telescoping drive shaft drivingly connected at one end to said power takeoff and extending forwardly of said body from said one end thereof and under said rear axle of the tractor, a telescoping countershaft disposed beneath said tractor body and extending laterally thereof, one end of the countershaft being drivingly connected to said implement, means movable with said frame assembly laterally of the tractor and drivingly connecting the other ends of the drive shaft and countershaft, and means for moving said first frame about said first axis.

5. In combination with a tractor having a body and a power takeoff, a gear box having an input connected to said takeoff and an output disposed below said body of the tractor, means supporting said gear box on one side of said tractor body for swinging movement about a first axis extending generally longitudinally of the tractor and above said gear box, an agricultural implement extending laterally of the other side of said tractor body, a frame pivotally connected at one end to said implement for relative movement therebetween about a horizontal second axis, means connecting the other end of said frame for movement with said gear box laterally of the tractor, said implement having a drive shaft, a telescoping driving connection connecting the output of said gear box and said implement drive shaft, and selectively operable means for swinging said gear box about said first axis thereby moving said implement laterally of the tractor.

6. In combination with a tractor having a power takeoff and a body, a gear box having an input connected to said takeoff and an output, means mounting said gear box on one side of the tractor for movement about a first axis extending generally longitudinally of the tractor and supporting said gear box for swinging movement about a second axis extending generally longitudinally of the tractor and disposed above said first axis, an agricultural implement disposed on the other side of the tractor and extending laterally of the tractor, said implement having a drive shaft, means connecting said gear box and implement for movement together laterally of the tractor, the drive shaft of the implement being drivingly connected to said output of said gear box, and means for swinging said gear box about said second axis thereby moving said implement laterally of the tractor.

7. In combination with a tractor having a body and a power takeoff, a gear box having an input and an output, said input of said gear box having an axis extending generally horizontally and longitudinally of the tractor, means journalling said gear box for movement about a first axis coinciding with the axis of said gear box input and for swinging movement about a second axis extending parallel to and spaced above said first axis, an agricultural implement extending laterally of the tractor and having a drive shaft, a frame extending generally laterally of the tractor, one end of said frame being pivotally connected to said implement for relative movement therebetween about a horizontal axis, the other end of said frame being connected for movement with said gear box laterally of the tractor, a first telescoping driving connection between said drive shaft and output of said gear box, a second telescoping driving connection between said gear box input and said takeoff, and means for moving said gear box about said second axis.

8. In combination with a tractor having a body, a front and rear axle and power takeoff at the rear thereof, a vertically extending first frame disposed between said front and rear axle, means supporting the upper end of said first frame on said tractor body for pivotal movement about a horizontal axis extending longitudinally of said tractor body and spaced outwardly from one side of said body, a gear box disposed adjacent the lower end of said frame and having an input and output, means journalling said gear box on said lower end of said frame for movement about a second axis extending parallel to and disposed beneath said first axis, a telescoping drive shaft extending generally longitudinally of the tractor and under said rear axle thereof, one end of said drive shaft being connected to said input of said gear box, means connecting the other end of said drive shaft to said takeoff, a second frame disposed beneath said tractor body and extending laterally thereof, means mounting one end of said second frame on said gear box for movement therewith, an agricultural implement disposed on the other side of said tractor body, means pivotally connecting the other end of said second frame to said implement for relative movement therebetween about a horizontal third axis, a telescoping drive shaft drivingly connecting said output of said gear box and said implement, and selectively operable means for moving said first frame about said first axis.

9. In combination with a tractor having a body and a power takeoff, a frame assembly comprising a generally vertically extending first frame disposed at one side of said tractor body, means supporting the upper end of said first frame for movement about a horizontal first axis extending longitudinally of the tractor, said frame assembly further comprising a second frame disposed beneath said tractor body and extending laterally thereof, an agricultural implement disposed on the other side of the tractor opposite said one side and having a drive shaft, said implement being pivotally connected to one end of said second frame for relative movement therebetween about a horizontal second axis, a gear box supported at the lower end of said first frame for pivotal movement about a third axis extending parallel to said first axis, said gear box having an input with an axis coinciding with said third axis and having an output, means connecting the other end of said second frame to said gear box for movement therewith, a telescoping drive shaft connected at one end to said implement drive shaft and at the other end to said output of said gear box, a second telescoping drive shaft connected at one end to said input of said gear box and at the other end to said takeoff, a counterbalance spring connected between said implement and frame assembly tending to lift the outer end of said implement, a generally vertically extending second counterbalance spring connected between said second frame and said tractor body, a lever pivotally mounted at one end on said second frame, means connecting the other end of said lever and said implement and extending over said second axis, a second lever pivotally mounted at one end on said tractor body, means connecting the other end of said second lever and said other end of said first lever, selectively operable means for pivoting said second lever thereby to lift said second frame and implement, and selectively operable means for moving said first frame about said first axis thereby moving said implement laterally of the tractor.

References Cited

UNITED STATES PATENTS

| | | | |
|---|---|---|---|
| 2,974,469 | 3/1961 | Smith | 172—79 X |
| 2,974,616 | 3/1961 | Pawela | 172—79 X |
| 3,066,745 | 12/1962 | Smith | 172—76 X |
| 3,127,940 | 4/1964 | Hutchinson | 172—79 |

FOREIGN PATENTS 942,600  5/1956  Germany.

ABRAHAM G. STONE, *Primary Examiner.*

WILLIAM A. SMITH III, *Examiner.*